(12) United States Patent
Stripf et al.

(10) Patent No.: US 6,263,487 B1
(45) Date of Patent: Jul. 17, 2001

(54) PROGRAMMABLE CONTROLLER

(75) Inventors: Wolfgang Stripf, Karlsruhe; Volker Wendel, Hagenbach, both of (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/101,611

(22) PCT Filed: Jan. 16, 1997

(86) PCT No.: PCT/DE97/00068

§ 371 Date: Jul. 17, 1998

§ 102(e) Date: Jul. 17, 1998

(87) PCT Pub. No.: WO97/26587

PCT Pub. Date: Jul. 24, 1997

(30) Foreign Application Priority Data

Jan. 17, 1996 (DE) ........................................ 296 00 609 U
Dec. 19, 1996 (DE) ........................................ 296 22 133 U

(51) Int. Cl.[7] ................................................ G06F 19/00
(52) U.S. Cl. .................. 717/1; 717/5; 717/6; 709/100
(58) Field of Search ................................. 709/100, 101, 709/102, 104, 105; 717/1, 4, 5, 6; 707/10, 104, 206; 700/23

(56) References Cited

U.S. PATENT DOCUMENTS 5,297,257  3/1994  Struger et al. .
5,485,620 * 1/1996 Sadre et al. ............................. 717/10
5,610,809 * 3/1997 Hideaki ................................... 700/23

FOREIGN PATENT DOCUMENTS 667 693   8/1995  (EP) .

OTHER PUBLICATIONS

"Mediator: an Intelligent Information System Supporting the Virtual Manufacturing Enterprise," B. R. Gaines et al., 1995 IEEE International Conference on Systems, Man and Cybernetics, Vancouver, Oct. 22–25, 1995, pp. 964–969.

"SIMATIC, Programmable Controllers SIMATIC S7," Catalog ST 70, Siemens, 1995.

"Java and Internet Programming," Van Hoff, Dr. Dobb's Journal, Aug. 1995, vol. 20, No. 8, pp. 56, 58, 60–61, and 101–02.

"Java!," T. Ritchey, New Riders Publishing, 1995, pp. 14–19.

"Supporting Microsoft Windows 95," Student Workbook, Course No. 540, Microsoft, Jul. 1995, pp. 120–121.

* cited by examiner

*Primary Examiner*—Majid A. Banakhah
(74) *Attorney, Agent, or Firm*—Staas & Halsey LLP

(57) ABSTRACT

A programmable controller suitable for use in a globally distributed automation network. In addition, a universal management engineering and information system for such a globally distributed automation network is described. It is used in a globally distributed automation network.

11 Claims, 4 Drawing Sheets

PROGRAMMABLE CONTROLLER

FIELD OF THE INVENTION

The present invention relates to a programmable controller. Furthermore, the present invention relates to a universal, distributed and interconnected automation and management engineering and information system.

BACKGROUND OF THE INVENTION

A programmable controller is described in Siemens Catalog ST 70, 1995. With a programming unit, a user creates a program for controlling an industrial process, including software function blocks, e.g., in the form of organization blocks, program blocks and entity data blocks. The programmable controller is connected to the programming unit by a bus system over which the programming unit transmits the control program to the programmable controller. Furthermore, an operating and monitoring device which is provided for process management can also be connected to the bus system, making it possible to display process images that incorporate multiple image objects.

It is frequently necessary for software function blocks of a control program to be transmitted from a programmable controller of a manufacturing site or from a software pool of this manufacturing site to a programmable controller of another manufacturing site. In particular, when the manufacturing sites are a great distance apart, e.g., because of globalization of manufacturing activities, these software function blocks are transmitted over the Internet, a global network. This requires servers with suitable communications interfaces which permit the use of the Internet communications protocol as well as the communications protocol of the programmable controller. On the basis of these different protocols and the architecture of the programmable controllers, it is impossible to tie in the software function blocks while the control program is running, especially when programmable controllers of different manufacturers are to be supplied with these software function blocks.

SUMMARY OF THE INVENTION

An object of the present invention is to create a programmable controller which is suitable for use in a globally distributed automation network.

In addition, a universal management engineering system is created in the form of a programming unit and an operating and monitoring device for a globally distributed automation network and also to create a management engineering and information system in the form of workstations and database servers.

DETAILED DESCRIPTION OF THE INVENTION

Figure 1:
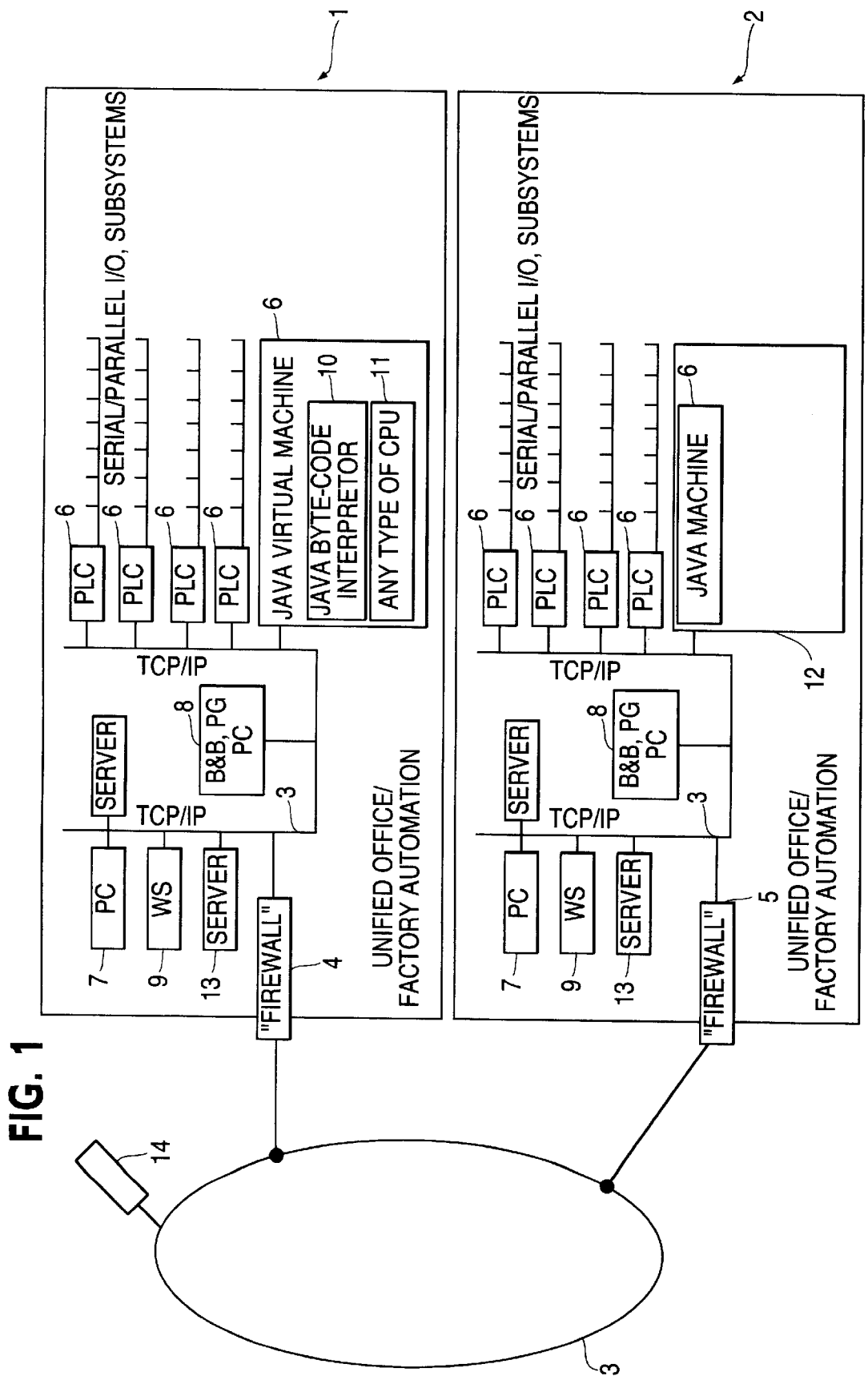
FIG. 1 shows a schematic diagram of a universal, distributed programmable controller and management engineering and information system.

As shown in FIG. 1, two manufacturing sites 1 and 2 of a globally distributed automation network are linked together over a conventional global network, the Internet, with suitable devices 4, 5 provided to prevent unauthorized data from being transmitted into the data processing components of manufacturing sites 1, 2. Manufacturing sites 1, 2 each have a plurality of units in the form of programmable controllers 6, programming units 7, operating and monitoring devices 8 and workstations 9, each of which is provided with an Internet communications interface. These Internet communications interfaces permit TCP/IP protocol communication among the various units. An important requirement of a programmable controller is that a control program formed by multiple software function blocks must be able to run cyclically and/or with interrupt control during control operation. These software function blocks must be designed so that they are loadable and can be tied into the control program while it is running. For this requirement to be met and the software function blocks to be loadable directly into a programmable controller over the Internet and the Internet communications interface, so that they can be tied in to the control program while it is running, the software function blocks have an object-oriented design. The software function blocks are dynamically loadable and expandable over the Internet, and the programmable controller is provided with a software function block execution system (PLC object engine system) that ties these software function blocks into the control program and processes them during control operation.

A programming language which creates an object-oriented code from a source language and is provided for use on the Internet is described in "Java!", T. Ritchey, New Riders Publishing, 1995. This book describes Java C, a source language with which an object-oriented Java byte code can be created. Additional advantageous properties of this process language include in particular the portability of the code and the error-handling mechanisms. The portability of the code ensures that a programmable controller with a execution system in the form of a Java byte code interpreter 10 can process the Java function blocks sent to the programmable controller over the Internet independently of a processor hardware architecture 11 of the programmable controller (regardless of manufacturer). For performance reasons, however, it is advantageous to provide the programmable controller with a Java processor 12 which processes the Java code directly.

Figure 2:
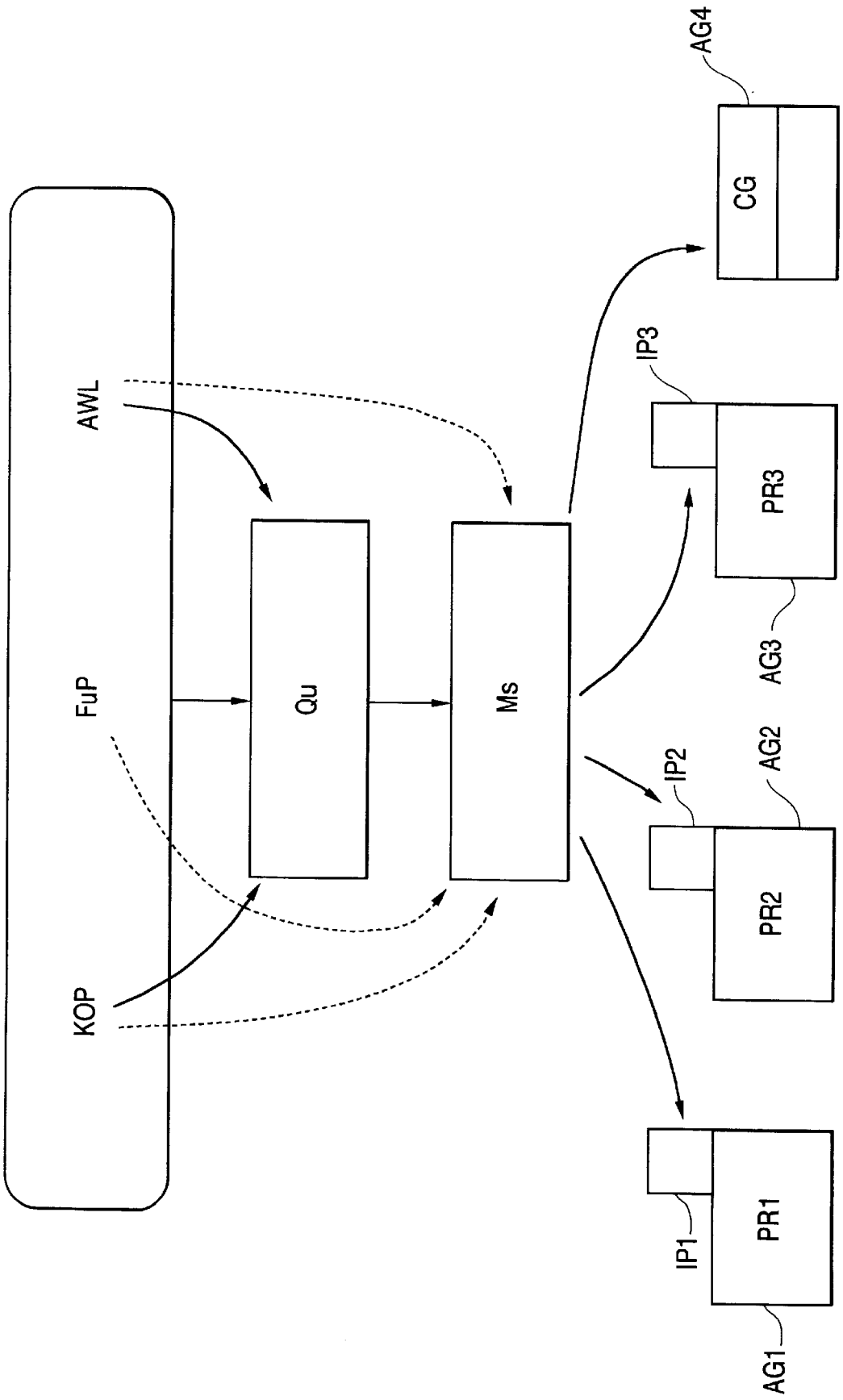
FIG. 2 shows a program translation structure diagram.

The portability of an object-oriented code is illustrated in FIG. 2, which shows a program translation structure diagram.

With a programming unit, a user creates a control program in the form of a contact plan KOP, a function plan FuP, an instruction list AWL or in any other suitable form, such as that described in the IEC 1131 standard, in accordance with a control objective to be achieved. The programming unit translates the control program, on the user level, into a source language Qu, e.g., the source language Java C, or directly (shown with broken lines in FIG. 2) into an object-oriented machine language Ms, e.g., in the Java byte code which is loaded into programmable controllers AG1, AG2, AG3, AG4 of different architectures. On a user level, only one compiler is required for all the programmable controllers to create the machine codes. It is assumed that programmable controller AG4 has a code generator G for processing the machine language Ms, so this programmable controller AG4 can process the code directly. It is also assumed that programmable controllers AG1, AG2, AG3 are not provided with such a code generator, but instead they have different processors PR1, PR2, PR3. In order for programmable controllers AG1, AG2, AG3 to be able to process code, these programmable controllers are each provided with a code interpreter IP1, IP2, IP3. These interpreters IP1, IP2, IP3 each generate a code that can be interpreted by processors PR1, PR2, PR3 while the control program is running.

The object-oriented software function blocks are programmed by the respective programming units 7 (FIG. 1) at manufacturing sites 1, 2 or by a programming unit 14 which is likewise connected to the Internet. In addition to operating and monitoring devices 8 and workstations 9, these programming units 8, 14 are parts of the management engineering system. The programming units send these software blocks to the corresponding programmable controllers over the Internet and the respective Internet communications interface. In the event that blocks must be altered, for example, programmable controller 6 or a server 13 first transmits the corresponding software function block over the Internet to one of programming units 7. Finally, programming unit 7 supplements or modifies this block and can transmit it again to one of the programmable controllers. The programming unit is also provided with a software function block execution system (PLC object engine system; Bos, ExE, Wd, IO) which is provided for simulation of the control program.

The processes to be controlled at manufacturing sites 1, 2 are operated and controlled by the operating and monitoring devices 8 that can be connected to the Internet and operated on the Internet. An operating and monitoring device 8, e.g., operating and monitoring device 8 at manufacturing site 1, creates an operating and monitoring program that encompasses an operating and monitoring software program for creating and displaying a process image containing multiple image objects, where the image objects are in relation to (in interaction with) software function blocks of the control program. The operating and monitoring software blocks are designed to be object-oriented and directly transmittable over the Internet. It is possible to create the process image on programming unit 7 and to send it over the Internet to operating and monitoring software unit 8 for process management.

To reduce the number of input and output components incorporated into a programmable controller in automation systems of a high degree of expansion, distributed subsystems are used, e.g., in the form of intelligent field units. The distributed automation and management engineering system here has an intelligent field unit (not shown) to which at least one software function block of a control program can be sent; the field unit processes the program cyclically and/or with interrupt control during control operation, and the software function block is designed to be loadable and to be tied into the control program while it is running. The software function blocks are designed to be object-oriented and loadable into a field unit over the Internet and an Internet communications interface of the field unit; the field unit has a software function block execution system (PLC object engine system; Bos, ExE, Wd, IO) for tie-in of the software function block SF01 , . . . , SF04 and processing the control program.

Figure 3:
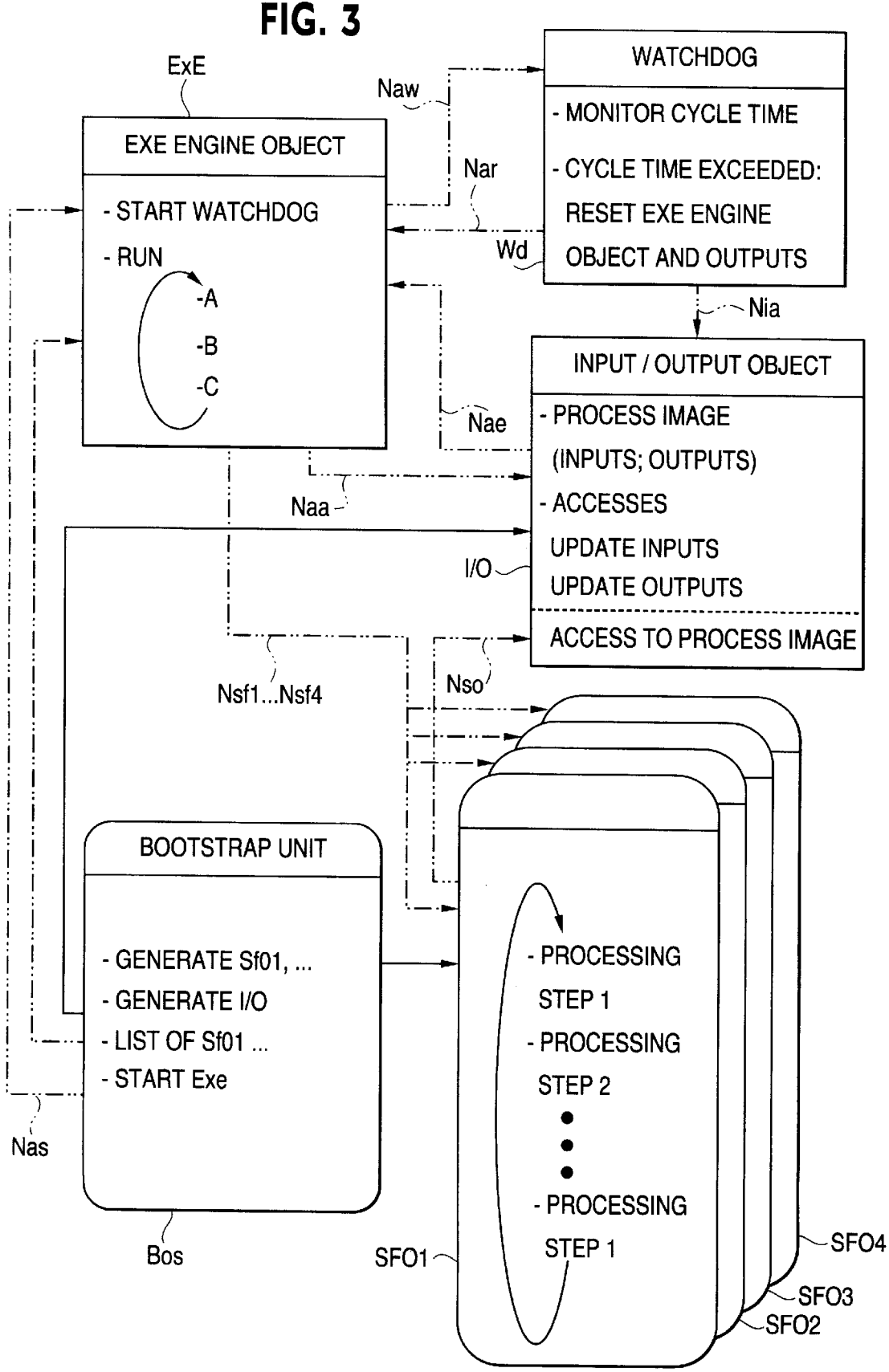
FIG. 3 shows software function block execution systems.
Figure 4:
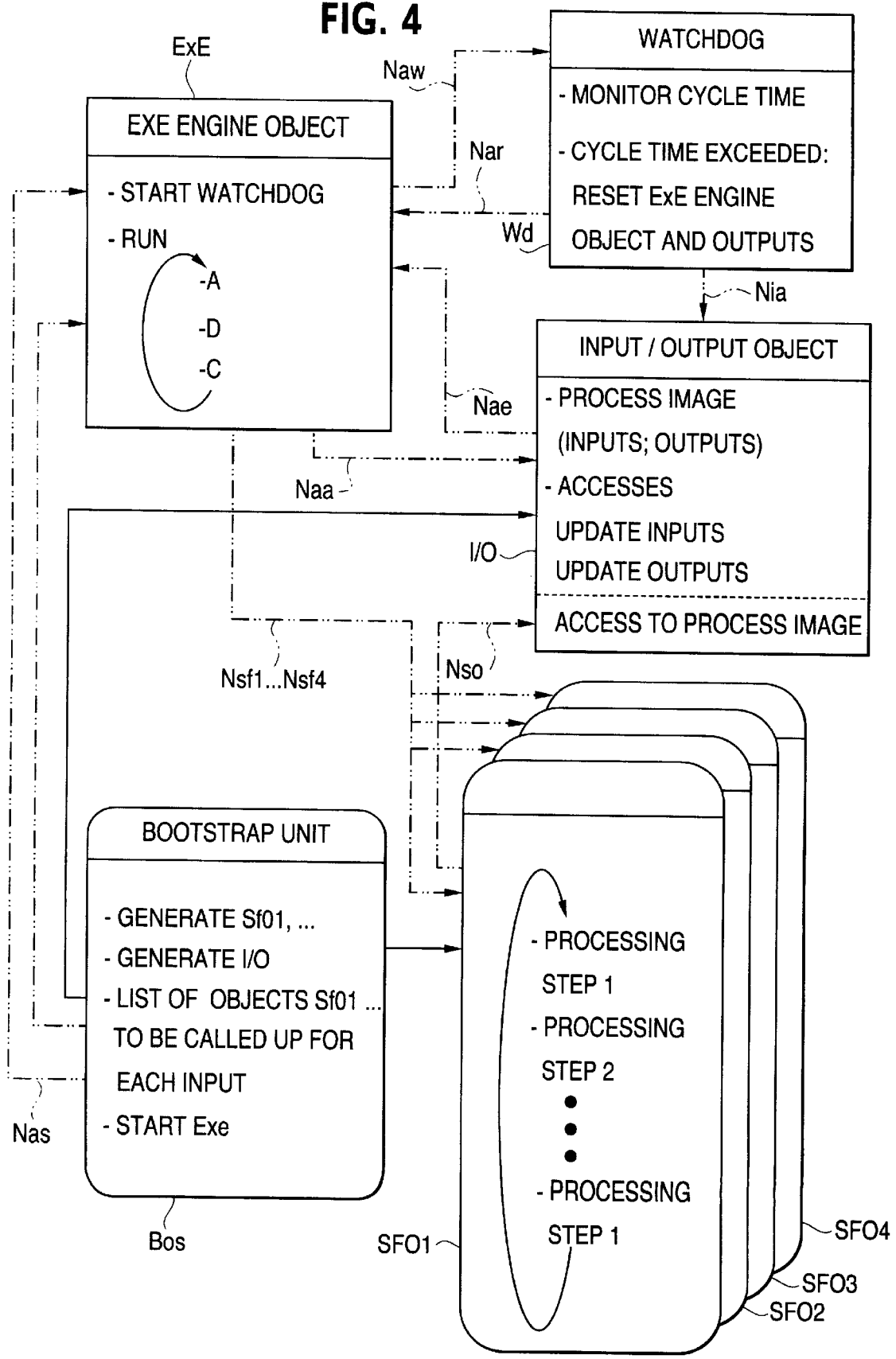
FIG. 4 also shows software function block execution systems.

Reference is now made to FIGS. 3 and 4, which show a software function block execution system (PLC object engine system) of a programmable controller and/or an intelligent field unit and/or a programming unit (for simulation of a control program). It is assumed first that a control program is to be processed cyclically (FIG. 3), i.e., regardless of the signal states of process inputs and outputs of an industrial process to be controlled, for example, the CPU of a programmable controller cyclically a. scans the signal states of the process inputs and deposits them in a process image of the inputs, b. executes the control program to be processed stepwise according to the requirements of that program, and c. deposits the calculated signal states in a process image of the outputs, with these signal states going from there to the process outputs.

Essential components of the software function block execution system are object-oriented programmed units in the form of a bootstrap Bos, an input/output module IO, an exe engine object ExE and a watchdog Wd. Watchdog Wd need not be designed as a software module, but may also be implemented in the hardware. In an exemplary embodiment of the present invention, the units exe engine object ExE and watchdog Wd are threads. The operation of a thread is described in "Supporting Microsoft Windows 95," Student Workbook, Microsoft Corp., July. 1995 and therefore need not be explained further here. A class of software function blocks and a class of input/output modules are deposited in bootstrap unit Bos. These classes are created by a user, for example, on a programming unit according to the requirements of a control objective to be achieved and are transmitted to a programmable controller, for example, or to a field unit. Before the start of control operation, bootstrap unit Bos creates software function block objects from the class of software function blocks and creates input/output module objects from the class of input/output modules. The present example shows only four software function block objects SF01 , . . . , SF04 and one input/output module object IO, in which a process image of inputs and outputs is deposited, to which the signal states of process inputs of the industrial process can be sent, and by which signal states can be sent to process outputs of this industrial process. Furthermore, at the beginning of control operation, bootstrap unit Bos sends exe engine object ExE a list of software function block objects SF01 , . . . , SF04 to be processed. At the beginning of control operation, bootstrap unit Bos transmits a message Nas (method call) which starts exe engine object ExE. In a first processing step, exe engine object ExE sends watchdog Wd a message Naw, which causes watchdog Wd to monitor the cycle time of exe engine object ExE. For the case when exe engine object ExE exceeds the intended cycle time, watchdog Wd resets exe engine object ExE by transmitting a message Nar to exe engine object ExE. Furthermore, in the case when the cycle time is exceeded, watchdog Wd resets the outputs of the process image and the process outputs, with watchdog Wd sending a message Nia to input/output module object IO. After exe engine object ExE has started watchdog Wd, exe engine object ExE assumes the control operation and first executes a processing cycle that includes the following steps:

A) Updating the process image inputs by exe engine object ExE reading the input signal states of the process image out of input/output module object IO, with the signal states being exchanged using a method call Nae between the objects, B) Processing one processing step of the software function block objects SF01 , . . . , SF04 , with exe engine object ExE sending appropriate method calls NSF1 . . . . NSF4 to software function block objects SF01 , . . . , SF04, software function block objects SF01 , . . . SF04 access the process image of input/output module object IO via method calls Nso, and finally C) Updating the outputs of the process image, by exe engine object ExE entering the outputs of the process image in input/output module object IO, the signal states being again exchanged using a method call Naa between the objects.

Input/output module object IO supplies the process outputs of the industrial process to be controlled and, as described above, software function block objects SF01, ..., SF04 with the input and output signal states of the process image over suitable interfaces.

Assuming the case of a control program to be processed with interrupt control (FIG. 4), i.e. in the case of changes in signal states at one of the process inputs of an industrial process to be controlled, suitable control measures must be taken without delay. The same parts in FIGS. 3 and 4 are provided with the same reference notation. Only the differences in comparison with cyclic processing of the control program are described below (FIG. 3). In the case of interrupt-controlled processing of the control program, bootstrap unit Bos does not transmit to exe engine object ExE the list of software function block objects to be processed, as is done in the case of cyclic processing, but instead it transmits a list of software function block objects to be "called" for each process input. Thus one software function block object is assigned to each process input, and with each change in signal state at a process input, the software function block object assigned to this input is to be started. In contrast with cyclic processing with regard to processing step B), exe engine object ExE executes a step D) during the processing cycle, i.e.:

D) Ascertaining changes in signal state at the inputs of the process image and processing the software function block objects assigned to these inputs.

The additional functions to be handled in industrial enterprises such as materials management, production scheduling, personnel use, etc. are combined under the heading of management information systems and are processed by workstations or servers which are also connected to the Internet. They make use of large databases which hold permanent object-oriented software function blocks as representatives of subprocesses and run them on demand.

The software function blocks of the programmable controller and the intelligent field unit are compatible with those in the management engineering system and those in the management engineering and information system with regard to drafting, designing, and programming of automation functions and communication between components of the automation system. Expansion and shifting of functions can thus be accomplished more easily and simply than previously.

The present invention creates an interconnected automation system which permits worldwide operation. This avoids the high degree of decoupling of programmable controllers and standard computers known from the related art, which opens up the possibility of object-oriented modeling of all corporate elements such as processes, resources and organizations. Implementation of software from these object models takes place via a uniform tool chain as part of an interconnected architecture. Simple software adjustments are possible in the process optimization and revision phase by shifting objects. Furthermore, a worldwide, flexible and distributed production with central planning, simulation and optimization are possible.

What is claimed is:

1. A programmable controller, comprising:
  an Internet communication interface receiving software function blocks of a control program, the software function blocks being loadable by the programmable controller and capable of being tied to the control program while the control program is being executed by the programmable controller, the control program having a control operation and being processed by the programmable controller at least one of cyclically and via interrupt control; and
  a software function block execution system including an exe engine object, a watchdog object, a bootstrap object, and an input/output module object, the software function block execution system storing process image inputs and process image outputs, receiving signal states from process inputs, and sending the signal states to process outputs, the bootstrap object generating software function block objects and the input/output module object before a start of the control operation, wherein if the control program is processed cyclically, the bootstrap object sends to the exe engine object a list of the software function block objects to be processed, and wherein if the control program is processed via interrupt control, the bootstrap object sends to the exe engine object a list of the software function block objects to be processed for each of the process inputs, and wherein at the start of the control operation, the bootstrap object starts the exe engine object, the exe engine starting the watchdog object, the watchdog object resetting the exe engine object when a cycle time is exceeded, the exe engine object cyclically i) updates the process image inputs, ii) if the control program is processed cyclically, processes one processing step of the software function block objects, iii) if the control program is processed via interrupt control, determines changes in the signal states at the process inputs and processes the software function block objects assigned to the process inputs, and iv) updates the process image outputs.

2. The programmable controller according to claim 1, wherein the exe engine object and the watchdog object are threads.

3. The programmable controller according to claim 1, wherein the Internet communication interface permits TCP/IP protocol communication.

4. The programmable controller according to the 1, wherein the software function blocks are Java byte coded, the software function blocks comprising one of i) Java C programming language code, and ii) a programming language code complying with IEC 1131.

5. A programming unit for creating software function blocks of a control program, comprising:
  an arrangement for creating object-oriented software function blocks;
  an Internet communication interface for at least one of i) transmitting the software function blocks to a programmable controller via the Internet, and ii) receiving the software function blocks via the Internet, the software function blocks being loadable by the programming unit and capable of being tied to the control program while the control program is being executed by the programming unit, the control program having a control operation and being processed by the programming unit at least one of cyclically and via interrupt control; and
  a software function block execution system including an exe engine object, a watchdog object, a bootstrap object, and an input/output module object, the software function block execution system storing process image inputs and process image outputs, receiving signal states from process inputs, and sending the signal states to process outputs, the bootstrap object generating software function block objects and the input/output module object before a start of the control operation, wherein if the control program is processed cyclically, the bootstrap object sends to the exe engine object a list of the software function block objects to be processed, and wherein if the control program is processed via interrupt control, the bootstrap object sends to the exe engine object a list of the software function block objects to be processed for each of the process inputs, and wherein at the start of the control operation, the bootstrap object starts the exe engine object, the exe engine starting the watchdog object, the watchdog object resetting the exe engine object when a cycle time is exceeded, the exe engine object cyclically i) updates the process image inputs, ii) if the control program is processed cyclically, processes one processing step of the software function block objects, iii) if the control program is processed via interrupt control, determines changes in the signal states at the process inputs and processes the software function block objects assigned to the process inputs, and iv) updates the process image outputs.

6. The programming unit according to claim 5, wherein the Internet communication interface permits TCP/IP protocol communication.

7. The programming unit according to the 5, wherein the software function blocks are Java byte coded, the software function blocks comprising one of i) Java C programming language code, and ii) a programming language code complying with IEC 1131.

8. An automation system, comprising:
   at least one programmable controller including:
      an Internet communication interface receiving software function blocks of a control program, the software function blocks being loadable by the at least one programmable controller and capable of being tied to the control program while the control program is being executed by the at least one programmable controller, the control program having a control operation and being processed by the at least one programmable controller at least one of cyclically and via interrupt control, and
      a software function block execution system including an exe engine object, a watchdog object, a bootstrap object, and an input/output module object, the software function block execution system storing process image inputs and process image outputs, receiving signal states from process inputs, and sending the signal states to process outputs, the bootstrap object generating software function block objects and the input/output module object before a start of the control operation, wherein if the control program is processed cyclically, the bootstrap object sends to the exe engine object sends a list of the software function block objects to be processed, and wherein if the control program is processed via interrupt control, the bootstrap object sends to the exe engine object a list of the software function block objects to be processed for each of the process inputs, and wherein at the start of the control operation, the bootstrap object starts the exe engine object, the exe engine starting the watchdog object, the watchdog object resetting the exe engine object when a cycle time is exceeded, the exe engine object cyclically i) updates the process image inputs, ii) if the control program is processed cyclically, processes one processing step of the software function block objects, iii) if the control program is processed via interrupt control, determines changes in the signal states at the process inputs and processes the software function block objects assigned to the process inputs, and iv) updates the process image outputs; and
   at least one operating and monitoring device including an operating and monitoring program, the operating and monitoring program including operating and monitoring software blocks.

9. An automation system, comprising:
   at least one programming unit including:
      an arrangement for creating object-oriented software function blocks;
      an Internet communication interface for at least one of i) transmitting the software function blocks to a programmable controller via the Internet, and ii) receiving the software function blocks via the Internet, the software function blocks being loadable by the at least one programming unit and capable of being tied to the control program while the control program is being executed by the at least one programming unit, the control program having a control operation and being processed by the at least one programming unit at least one of cyclically and via interrupt control, and
      a software function block execution system including an exe engine object, a watchdog object, a bootstrap object, and an input/output module object, the software function block execution system storing process image inputs and process image outputs, receiving signal states from process inputs, and sending the signal states to process outputs, the bootstrap object generating software function block objects and the input/output module object before a start of the control operation, wherein if the control program is processed cyclically, the bootstrap object sends to the exe engine object a list of the software function block objects to be processed, and wherein if the control program is processed via interrupt control, the bootstrap object sends to the exe engine object a list of the software function block objects to be processed for each of the process inputs, and wherein at the start of the control operation, the bootstrap object starts the exe engine object, the exe engine starting the watchdog object, the watchdog object resetting the exe engine object when a cycle time is exceeded, the exe engine object cyclically i) updates the process image inputs, ii) if the control program is processed cyclically, processes one processing step of the software function block objects, iii) if the control program is processed via interrupt control, determines changes in the signal states at the process inputs and processes the software function block objects assigned to the process inputs, and iv) updates the process image outputs; and
   at least one operating and monitoring device including an operating and monitoring program, the operating and monitoring program including operating and monitoring software blocks.

10. The automation system according to claim 8, further comprising:
   at least one of a workstation and a server, the at least one of the workstation and the server including a means for creating and processing the software function blocks.

11. The automation system according to claim 9, further comprising:
   at least one of a workstation and a server, the at least one of the workstation and the server including a means for creating and processing the software function blocks.

* * * * *